US010265800B2

(12) United States Patent
Kawada et al.

(10) Patent No.: US 10,265,800 B2
(45) Date of Patent: Apr. 23, 2019

(54) WELDING APPARATUS AND NOZZLE DEVICE

(71) Applicant: KABUSHIKI KAISHA TOSHIBA, Tokyo (JP)

(72) Inventors: Yoshitaka Kawada, Tokyo (JP); Naotada Okada, Kanagawa (JP); Susumu Yahagi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 714 days.

(21) Appl. No.: 14/876,264

(22) Filed: Oct. 6, 2015

(65) Prior Publication Data

US 2016/0101483 A1  Apr. 14, 2016

(30) Foreign Application Priority Data

Oct. 8, 2014  (JP) ................................ 2014-207394

(51) Int. Cl.
*B23K 26/142* (2014.01)
*B23K 26/14* (2014.01)
*B23K 26/242* (2014.01)

(52) U.S. Cl.
CPC .......... *B23K 26/242* (2015.10); *B23K 26/142* (2015.10); *B23K 26/1438* (2015.10); *B23K 26/1462* (2015.10)

(58) Field of Classification Search
CPC ........ B23K 26/12; B23K 26/21; B23K 26/14; B23K 26/1438; B23K 26/147
USPC ............................ 219/121.63–121.72, 121.84
See application file for complete search history.

(56) References Cited

U.S. PATENT DOCUMENTS

| 2,053,417 A * | 9/1936 | Brace ..................... B23K 9/173 219/123 |
| 4,987,286 A * | 1/1991 | Allen .................... B08B 7/0042 219/121.6 |
| 8,487,209 B2 * | 7/2013 | Sakamoto .......... B23K 26/0884 219/121.63 |
| 2007/0145026 A1 | 6/2007 | Murase et al. |

FOREIGN PATENT DOCUMENTS

| CN | 102672349 A | 9/2012 |
| JP | H05-50284 A | 3/1993 |
| JP | H05-208291 A | 8/1993 |
| JP | H08-309577 A | 11/1996 |
| JP | H10-24384 A | 1/1998 |
| JP | H10-314974 A | 12/1998 |
| JP | 2002-113588 A | 4/2002 |

(Continued)

OTHER PUBLICATIONS

Chinese Office Action dated Nov. 23, 2016 in counterpart Chinese patent application No. 2015-10644539.5, and partial English translation.

*Primary Examiner* — Samuel M Heinrich
(74) *Attorney, Agent, or Firm* — Foley & Lardner LLP

(57) ABSTRACT

According to one embodiment, a welding apparatus includes an irradiation device and a nozzle device. The irradiation device irradiates a target with laser light while scanning the laser light. The nozzle device includes an ejection port and ejects inert gas to an irradiation position of the laser light on the target through the ejection port located at a forward side in a scanning direction of the laser light relative to the irradiation position.

5 Claims, 13 Drawing Sheets

(56) References Cited

FOREIGN PATENT DOCUMENTS

| | | |
|---|---|---|
| JP | 2007-7724 A | 1/2007 |
| JP | 2007-021574 A | 2/2007 |
| JP | 2012-155933 A | 8/2012 |
| JP | 2013-197034 A | 9/2013 |

* cited by examiner

WELDING APPARATUS AND NOZZLE DEVICE

CROSS-REFERENCE TO RELATED APPLICATION(S)

This application is based upon and claims the benefit of priority from Japanese Patent Application No. 2014-207394, filed Oct. 8, 2014, the entire contents of which are incorporated herein by reference.

FIELD

Embodiments described herein relate generally to a welding apparatus and a nozzle device.

BACKGROUND

Conventionally, welding apparatuses that irradiate a target with laser light and cover a laser light irradiation position (welded portion) on the target with inert gas have been used. The laser light irradiation position is covered with the inert gas in this manner, thereby preventing oxidization of the welded portion.

In the welding apparatuses of this type, when fume generated from the target by irradiation with the laser light passes through the laser light, intensity of the laser light is lowered in some cases. To provide a welding apparatus and a nozzle device capable of preventing the lowering of the intensity of the laser light due to the fume is meaningful.

BRIEF DESCRIPTION OF THE DRAWINGS

FIG. 9 is an exemplary and schematic plan view (partial sectional view) of a part of a welding apparatus in the first modification of the first embodiment;

DETAILED DESCRIPTION

Figure 1:
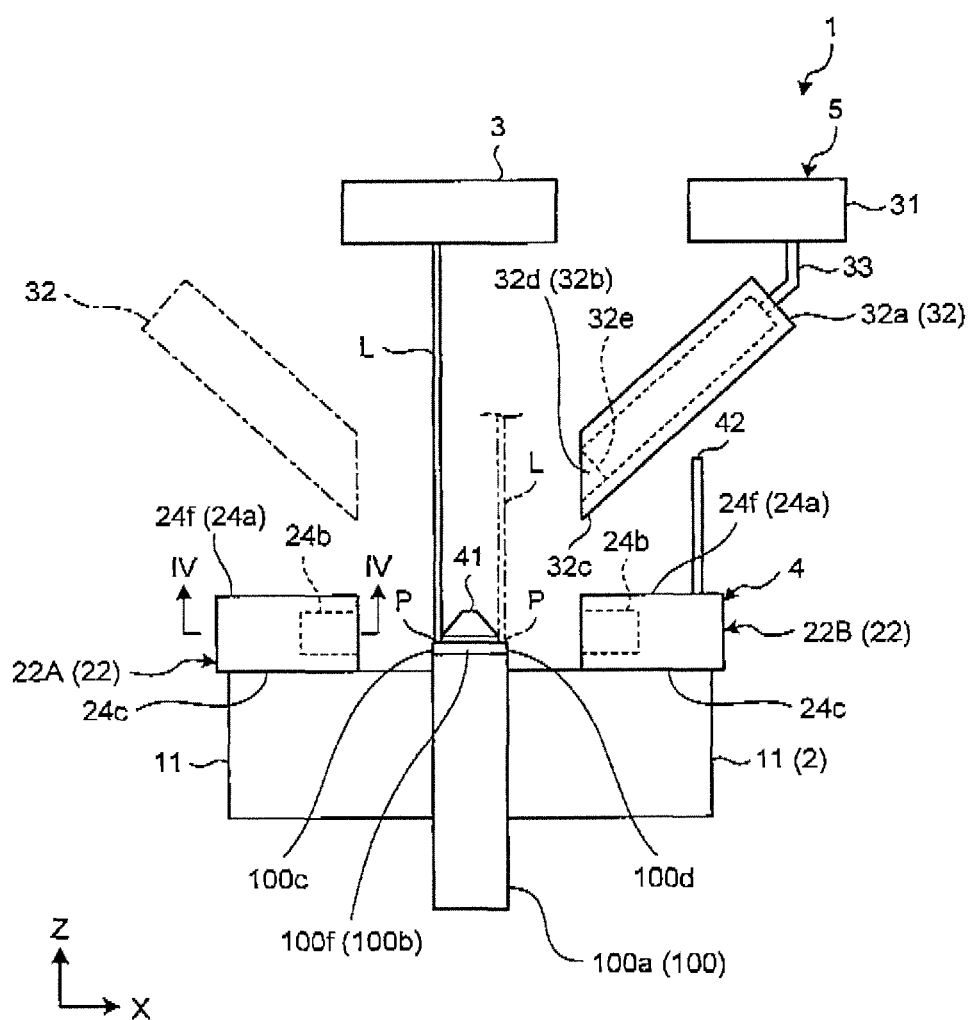
FIG. 1 is an exemplary and schematic view of a welding apparatus according to a first embodiment.

In general, according to one embodiment, a welding apparatus comprises an irradiation device and a nozzle device. The irradiation device irradiates a target with laser light while scanning the laser light. The nozzle device includes an ejection port and ejects inert gas to an irradiation position of the laser light on the target through the ejection port located at a forward side in a scanning direction of the laser light relative to the irradiation position.

The following exemplary embodiments and modifications include the same components. Hereinafter, common reference numerals denote the same components and overlapped description is partially omitted. Configurations in the embodiments and modifications that will be described below and actions, results, and effects provided by the configurations are merely examples. As illustrated in the drawings, in the embodiment, an X axis, a Y axis, and a axis are defined. The X axis, the Y axis, and the Z axis are orthogonal to one another. In the embodiment, the X-axis direction corresponds to the width direction of a support device 2 or 502, the Y-axis direction corresponds to the depth (lengthwise) direction of the support device 2 or 502, and the Z-axis direction corresponds to the height direction (up-down direction) of the support device 2 or 502.

First Embodiment

As illustrated in FIG. 1, a welding apparatus 1 (laser welding apparatus) in the embodiment irradiates a target 100 with laser light L and ejects inert gas to an irradiation position P of the laser light L on the target 100. With the irradiation and ejection, welding with the laser light 1 is performed in a state where the irradiation position P of the laser light L is covered with the inert gas. The welding by the welding apparatus 1 is performed under an atmospheric pressure environment or under a reduced pressure environment.

Figure 2:
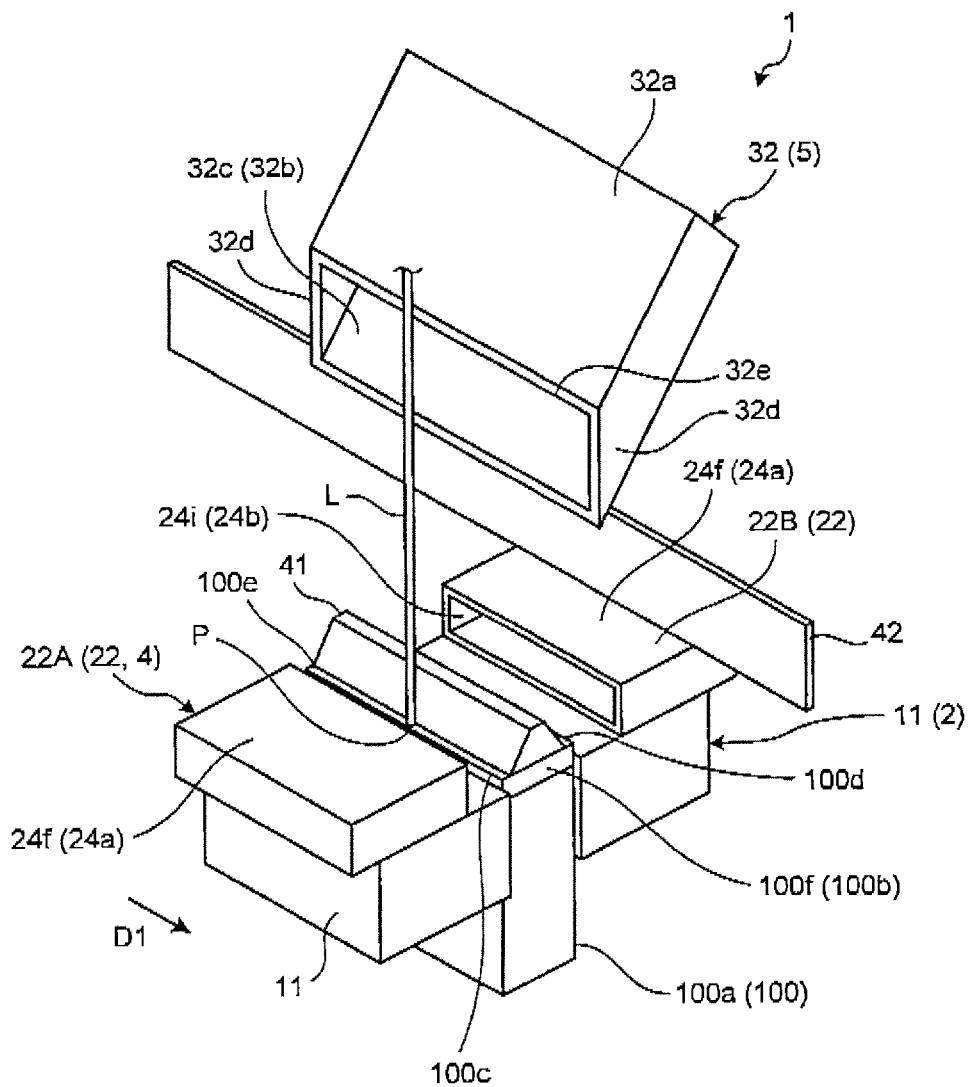
FIG. 2 is an exemplary and schematic perspective view of the welding apparatus in the first embodiment.
Figure 3:
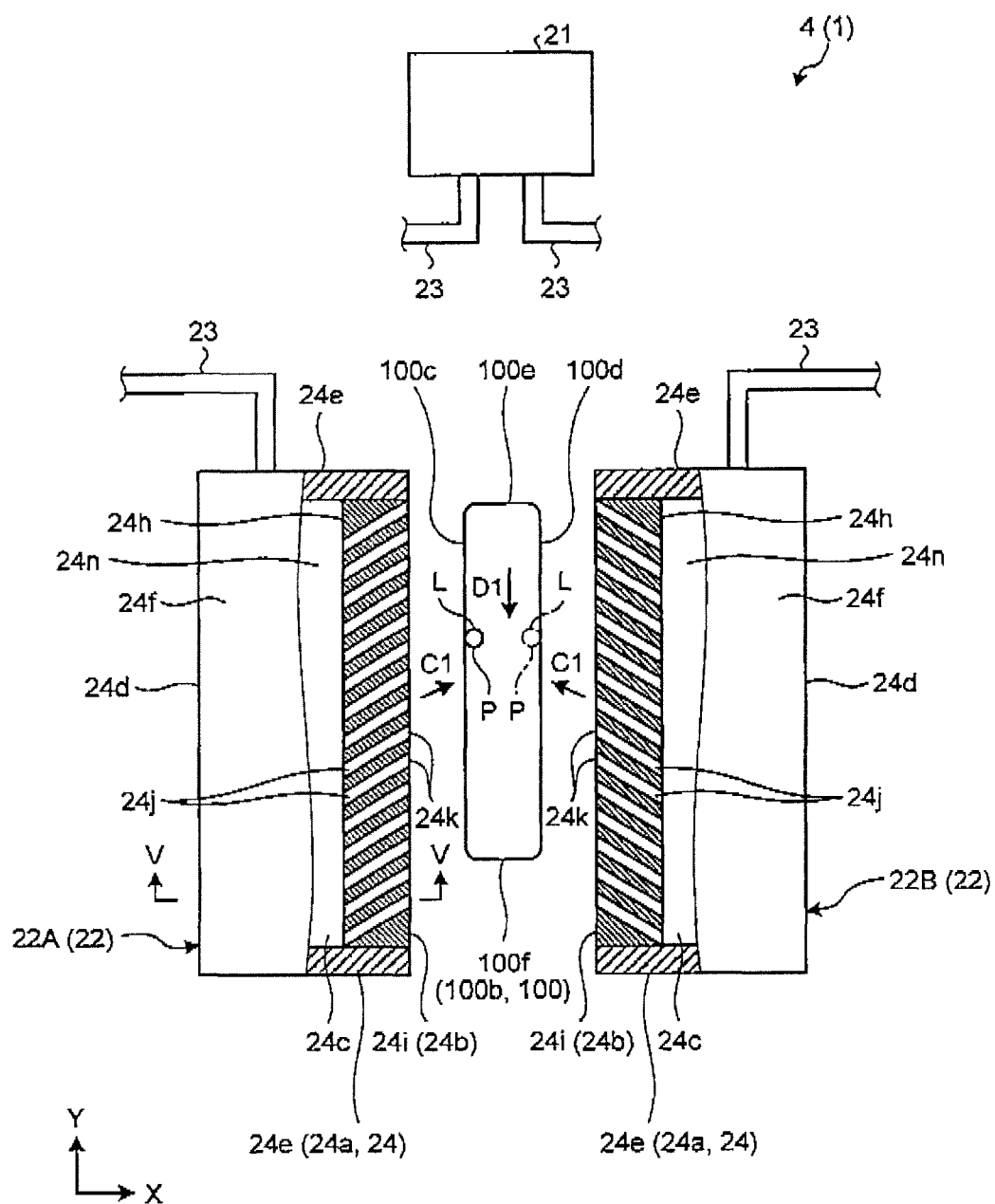
FIG. 3 is an exemplary and schematic plan view (partial sectional view) of nozzle devices in the first embodiment.

As illustrated in FIGS. 1 and 2, the target 100 is a container having a substantially rectangular parallelepiped outer shape, for example. The target 100 includes two members 100a and 100b. The member 100a has an opening in an upper end portion and has a substantially rectangular parallelepiped outer shape. The member 100b is configured into a plate-like form and closes the opening of the member 100a. As illustrated in FIGS. 2 and 3, the member 100b has two long-side portions 100c and 100d and two short-side portions 100e and 100f. In the embodiment, the welding apparatus 1 irradiates edge portions (for example, the long-side portions 100c and 100d) of the member 100a with the laser light L from the upper side of the member 100a in a state where the member 100b is superimposed on the upper end portion of the member 100a so as to weld the member 100a and the member 100h. It should be noted that the target 100 is not limited to the container.

As illustrated in FIGS. 1 and 2, the welding apparatus 1 includes the support device 2, an irradiation device 3 (FIG. 1), a gas ejection device 4, and a gas suction device 5. The support device 2 supports the target 100. The irradiation device 3 irradiates the target 100 supported by the support device 2 with the laser light L. The gas ejection device 4 supplies inert gas to the irradiation position P of the laser light L. The gas suction device 5 sucks the inert gas that has passed through the irradiation position P of the laser light L and the periphery of the irradiation position P.

The support device 2 includes two support members 11. The support members 11 have substantially rectangular parallelepiped outer shapes. The two support members 11 are aligned in the width direction (X-axis direction) of the support device 2. At least one of the two support members 11 is provided such that the position thereof in the X-axis direction can be changed. A distance between the two support members 11 can be therefore changed. The target 100 is located between the two support members 11 located so as to be separated from each other in the X-axis direction. The two support members 11 hold (support) the target 100 located between the support members 11.

The irradiation device 3 is located above the support device 2. The irradiation device 3 irradiates the target 100 with the laser light L while scanning the laser light L. The irradiation device 3 irradiates the target 100 with one laser light beam L per time. The irradiation device 3 includes various components such as a light source having an oscillation element and emitting the laser light L and a component causing the irradiation position P of the laser light L to move. The irradiation device 3 can scan (move) the laser light L along the outer surface (upper surface) of the target 100. The irradiation device 3 irradiates the target 100 with the laser light L from the upper side. A scanning direction D1 (FIG. 2) of the laser light L with which the long-side portions 100c and 100d of the target 100 are irradiated is a direction toward the short-side portion 100f from the short-side portion 100e and is along the Y-axis direction. The laser light L is continuous laser (CW laser light) or pulse laser.

As illustrated in FIG. 3, the gas ejection device 4 includes one gas supply source 21 (supply unit) and a plurality of nozzle devices 22.

The gas supply source 21 supplies the inert gas to the nozzle devices 22 through pipes 23. The gas supply source 21 can selectively supply the inert gas to the nozzle devices 22. The inert gas may be nitrogen gas, argon gas, or helium gas, or mixed gas containing two or mare of the nitrogen gas, the argon gas, and the helium gas, for example. Alternatively, any gas can be used as long as the gas has an effect preventing oxidization of a welded portion.

The nozzle devices 22 eject the inert gas supplied from the gas supply source 21 through the pipes 23 to the irradiation position P from the forward side in the scanning direction D1 of the laser light L relative to the irradiation position P of the laser light L. As illustrated in FIGS. 2 and 3, two (the plurality of) nozzle devices 22A and 22B are provided as the nozzle devices 22 in the embodiment. The nozzle device 22A is superimposed on the upper surface of one support member 11 of the two support members 11. The nozzle device 22A ejects the inert gas to the irradiation position P of the laser light L on one long-side portion 100c of the target 100. The nozzle device 22B is superimposed on the upper surface of the other support member 11 of the two support members 11. The nozzle device 22B ejects the inert gas to the irradiation position P of the laser light L on the other long-side portion 100d of the target 100. The gas ejection device 4 can switch between the ejection of the inert gas by the nozzle device 22A and the ejection of the inert gas by the nozzle device 22B.

The nozzle devices 22 have the same configuration. Hereinafter, the nozzle devices 22 are described in detail with reference to FIGS. 4 to 6 and the like illustrating details of the nozzle device 22A.

Figure 4:
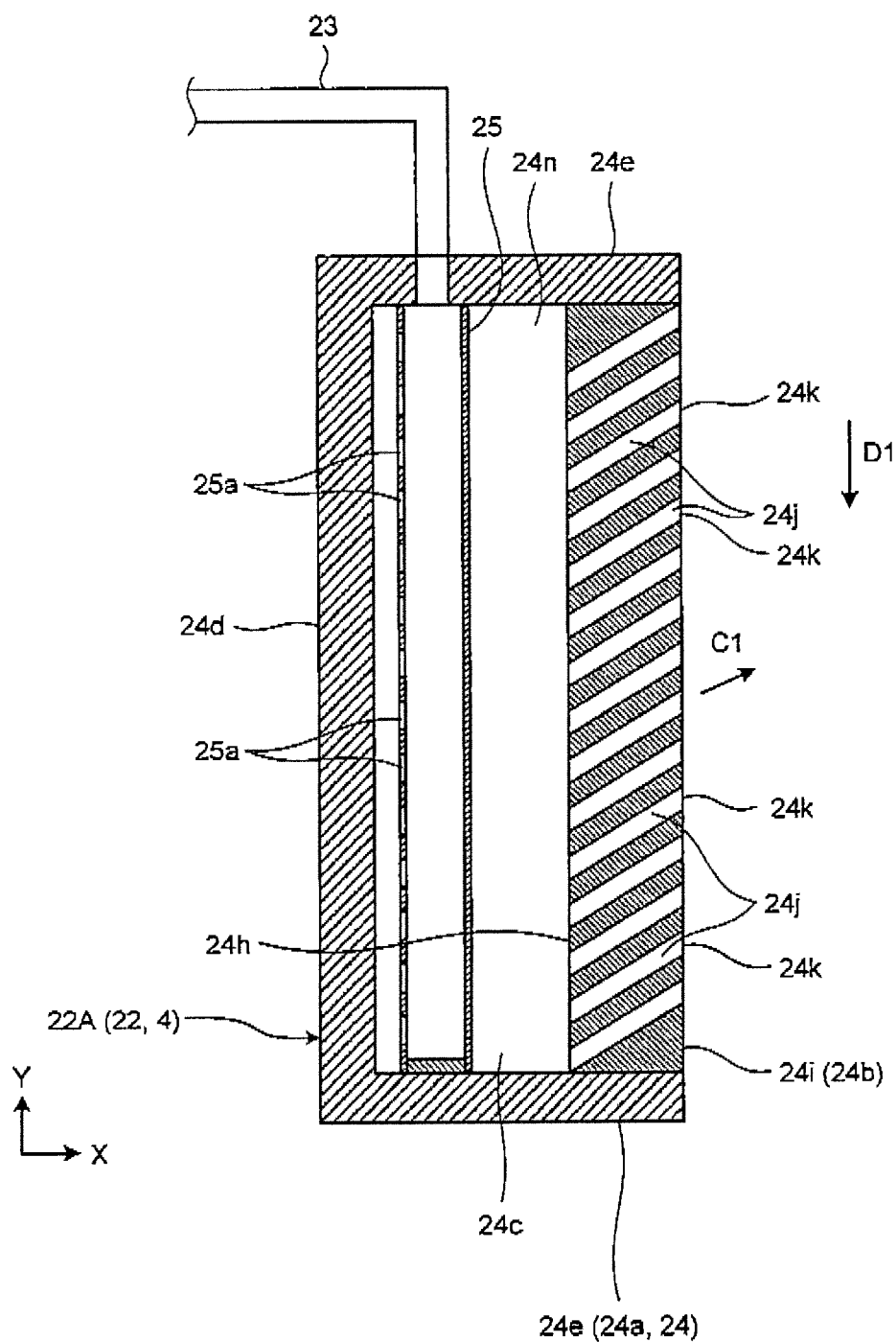
FIG. 4 is a sectional view cut along a line IV-IV in FIG. 1.

As illustrated in FIGS. 1 to 4, each nozzle device 22 includes a nozzle portion 24 and a pipe 25 (FIG. 4). The pipe 25 is accommodated in the nozzle portion 24 and is connected to the pipe 23. The inert gas is supplied into the nozzle portion 24 from the pipe 23 through the pipe 25.

The nozzle portion 24 has a substantially rectangular parallelepiped outer shape. The nozzle portion 24 includes a body 24a (main unit) and a rectifying member 24b. The body 24a has a substantially rectangular parallelepiped outer shape opened toward the target 100 (in the width direction of the support device 2). The body 24a has a plurality of wall portions (walls) including a bottom wall 24c, a side wall 24d, two end walls 24e, and a top wall 24f. The side wall 24d is an example of a second portion.

The bottom wall 24c (wall portion) faces the upper surface of the support member 11. The bottom wall 24c is formed into a plate-like form having a square shape (for example, rectangular shape). The bottom wall 24c extends along an XY plane. The side wall 24d (wall portion) is formed into a plate-like form having a square shape (for example, rectangular shape). The side wall 24d is connected to one end portion, at the farther side from the target 100, of both end portions of the bottom wall 24c in the short-side direction (X-axis direction), and extends along the direction intersecting with the bottom wall 24c (in the embodiment, direction orthogonal to the bottom wall 24c as an example, along a YZ plane). The end walls 24e (wall portions) are formed into plate-like forms having square shapes (for example, rectangular shapes), and are connected to end portions of the bottom wall 24c in the lengthwise direction (Y-axis direction). The end walls 24e extend along the direction intersecting with the bottom wall 24c (in the embodiment, direction orthogonal to the bottom wall 24c as an example, along an XZ plane). The side wall 24d is connected to the end walls 24e. The top wall 24f (wall portion) is formed into a plate-like form having a square shape (for example, rectangular shape). The top wall 24f is connected to the upper end portions of the side wall 24d and the end walls 24e and extends along the direction intersecting with the side wall 24d and the end walls 24e (in the embodiment, direction orthogonal to the side wall 24d and the end walls 24e as an example, along the XY plane). The bottom wall 24c and the top wall 24f are arranged so as to be aligned (in the embodiment, in parallel as an example) in a state where the inner surfaces thereof (internal surfaces of the body 24a) face (oppose) each other. The two end walls 24e are arranged so as to be aligned (in the embodiment, in parallel as an example) in a state where the inner surfaces thereof face (oppose) each other. In the body 24a having this configuration, a recess having a rectangular parallelepiped shape opened toward the target 100 (in the width direction of the support device 2) is formed.

The rectifying member 24b has a substantially rectangular parallelepiped outer shape. The rectifying member 24b is fitted into an end portion of the recess of the body 24a at the opening side. The rectifying member 24b is surrounded by edge portions of the bottom wall 24c, the end walls 24e, and the top wall 24f. The rectifying member 24b is provided in the nozzle portion 24 at the opposite side to the side wall 24d. The rectifying member 24b is separated from the side wall 24d. The rectifying member 24b is an example of a rectifying unit and a first portion.

The rectifying member 24b has faces 24h and 24i. The face 24h faces an inner portion of the body 24a. The face 24i is separated from the side wall 24d. The face 24i is provided at the opposite side to the face 24h and faces an outer portion of the body 24a.

A plurality of passages 24j are provided in the rectifying member 24b. The inert gas flows in the passages 24j. The passages 24j extend to the face 24i from the face 24h and are opened in the faces 24h and 24i. The passages 24j each are inclined with respect to the scanning direction D1 of the laser light L. To be specific, the passages 24j each extend to the backward side (upper side in FIG. 4) in the scanning direction D1 of the laser light L toward the face 24i from the face 24h. Outlets (openings in the faces 24i) of the passages 24j configure ejection ports 24k. The ejection ports 24k are aligned along the scanning direction D1 of the laser light L. A positional relation between the ejection ports 24k and the irradiation position P of the laser light L is changed with scanning of the laser light L. At least one of the ejection ports 24k is located at the forward side in the scanning direction D1 of the laser light L relative to the irradiation position P of the laser light L.

The rectifying member 24b ejects the inert gas through the respective ejection ports 24k. A direction C1 in the drawings indicates the ejection direction of the inert gas through the ejection ports 24k. In this case, the inert gas is ejected to the irradiation position P of the laser light L from the forward side in the scanning direction D1 of the laser light L through the ejection ports 24k located at the forward side (lower side in FIG. 3) in the scanning direction D1 of the laser light L relative to the irradiation position P of the laser light L on the target 100 among the ejection ports 24k. To be specific, the inert gas is ejected to the irradiation position P of the laser light L from the obliquely forward side in the scanning direction D1 of the laser light L through the ejection ports 24k located at the forward side (lower side in FIG. 3) in the scanning direction D1 of the laser light L relative to the irradiation position P of the laser light L on the target 100 among the ejection ports 24k.

Figure 6:
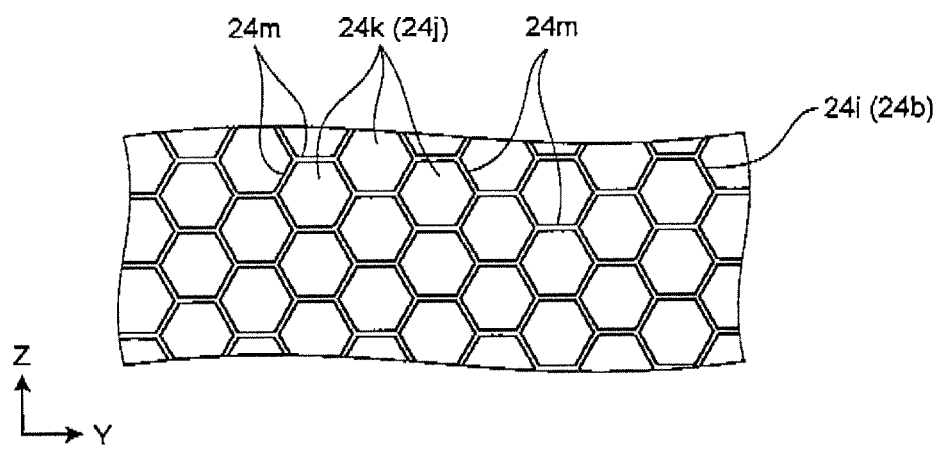
FIG. 6 is an exemplary and schematic view of ejection ports of the nozzle device in the first embodiment.

As is seen from FIG. 6, the sections of the passages 24j in the direction intersecting with the extension direction of the respective passages 24j have hexagonal shapes and the rectifying member 24b is configured to have a honeycomb structure. The rectifying member 24b has a plurality of walls 24m forming the passages 24j (facing the passages 24j). It should be noted that the sections of the passages 24j in the direction intersecting with the extension direction of the passages 24j are not limited to the hexagonal shapes and may be polygonal shapes other than the hexagonal shapes, circular shapes, or the like. The rectifying member 24b is also referred to as an ejection unit.

As illustrated in FIGS. 3 and 4, the nozzle portion 24 includes a buffer chamber 24n. The buffer chamber 24n is surrounded by the bottom wall 24c, the side wall 24d, the end walls 24e, the top wall 24f, and the face 24h of the rectifying member 24b. That is to say, the bottom wall 24c, the side wall 24d, the end walls 24e, the top wall 24f, and the rectifying member 24b face the buffer chamber 24n. The buffer chamber 24n is provided in the recess of the body 24a.

Figure 5:
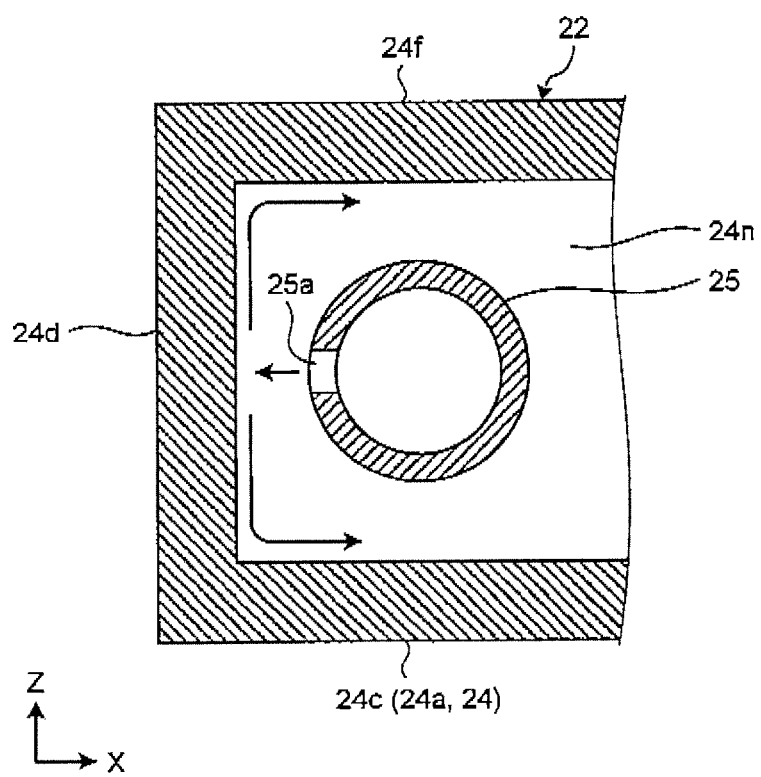
FIG. 5 is a sectional view cut along a line V-V in FIG. 3.

As illustrated in FIGS. 4 and 5, the pipe 25 is accommodated in the buffer chamber 24n. The pipe 25 extends along the scanning direction D1 of the laser light L. One end portion of the pipe 25 communicates with the pipe 23 and the other end portion of the pipe 25 is closed. A plurality of openings 25a (through-holes) are provided on the pipe 25. The openings 25a are aligned substantially linearly at an interval in the scanning direction D1 of the laser light L. The openings 25a are opened in the different direction from the side of the ejection ports 24k on the pipe 25. To be specific, the openings 25a are opened to the side wall 24d side. The openings 25a are an example of a first opening. The openings 25a may be opened to the bottom wall 24c side, the top wall 24f side, or the like in the different direction from the side of the ejection ports 24k on the pipe 25. The openings 25a may be opened to the side of the ejection ports 24k on the pipe 25.

Figure 7:
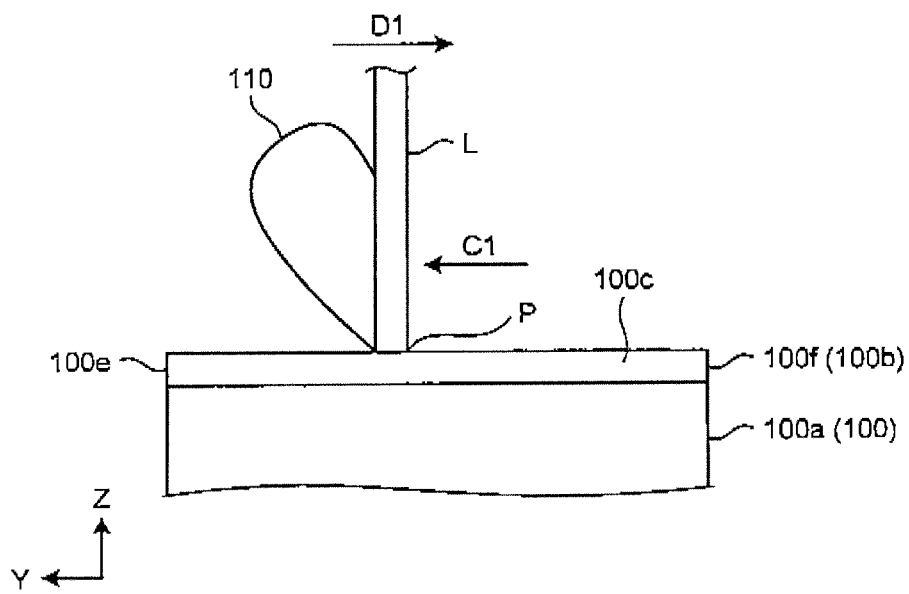
FIG. 7 is an exemplary and schematic view illustrating flow of fume in the first embodiment.

In the nozzle device 22 having the above-mentioned configuration, the inert gas that has flown into the pipe 25 from the pipe 23 flows out toward the side wall 24d through the openings 25a so as to flow into the buffer chamber 24n. The flow direction of the inert gas that has flown into the buffer chamber 24n is changed by the side wall 24d, the bottom wall 24c, and the top wall 24f, and the inert gas flows toward the rectifying member 24b. Then, the inert gas flows into the passages 24j of the rectifying member 24b. The rectifying member 24b rectifies the flow of the inert gas flowing in the passages 24j by the walls 24m. The rectified inert gas is ejected through the ejection ports 24k. In this case, the inert gas is ejected to the irradiation position P of the laser light L from the obliquely forward side in the scanning direction D1 of the laser light L through the ejection ports 24k located at the forward side (lower side in FIG. 3) in the scanning direction D1 of the laser light L relative to the irradiation position P of the laser light L among the ejection ports 24k. The inert gas causes fume 110 generated from the irradiation position P by the irradiation with the laser light L and elevating from the irradiation position P to be flown to the backward side of the laser light L in the scanning direction D1 of the laser light L, as illustrated in FIG. 7. To be specific, the fume 110 flows to the obliquely backward side in the scanning direction D1 of the laser light L. Vapor of a material (for example, aluminum) of the target 100 that has been molten and evaporated by the laser light L aggregates to turn into fine particles. The aggregation of the fine particles forms the fume 110.

As illustrated in FIG. 1, the gas suction device 5 includes a gas suction source 31 (sucking portion) and a duct 32. The gas suction source 31 and the duct 32 are connected to each other through a pipe 33. The gas suction source 31 generates sucking force for sucking the air. The gas suction device 5 sucks the inert gas ejected from the nozzle device 22 and the fume 110 generated from the irradiation position P (processed point) from the duct 32 with the suction force of the gas suction source 31.

The duct 32 includes a cylinder portion 32a and an extension portion 32b (introduction portion). The cylinder portion 32a is formed into a rectangular cylindrical form. The cylinder portion 32a is arranged with a posture that the cylinder center of the cylinder portion 32a is inclined with respect to the Z-axis direction. An opening 32e is provided on one end portion of the cylinder portion 32a at the lower side in the cylinder center direction. The other end portion of the cylinder portion 32a at the upper side in the cylinder center direction is closed. The pipe 33 is connected to the upper end portion of the cylinder portion 32a.

As illustrated in FIGS. 1 and 2, the extension portion 32b extends from one end portion of the cylinder portion 32a. The extension portion 32b has one base wall 32c and two end walls 32d. The base wall 32c extends from a lower edge portion of one end portion of the cylinder portion 32a. The end walls 32d are provided on edge portions of the base wall 32c in the direction orthogonal to the cylinder center direction of the cylinder portion 32a. The extension portion 32b guides (introduces) the inert gas and the fume 110 generated from the irradiation position P (processed point) to the opening 32e.

At least the duct 32 of the gas suction device 5 is movably supported by a movement device (not illustrated). In the embodiment, as illustrated in FIGS. 1 and 2, the duct 32 is located at the opposite side to the nozzle device 22 with respect to the target 100 when the laser light L is emitted. For example, when the long-side portion 100c is irradiated with the laser light L and the nozzle device 22A ejects the inert gas, the duct 32 is located at the opposite side to the nozzle device 22A with respect to the target 100 (duct 32 as indicated by a solid line in FIG. 1). In this case, the duct 32 sucks the inert gas that has been ejected from the nozzle device 22A and has passed through above the target 100 through the opening 32e. On the other hand, when the long-side portion 100d is irradiated with the laser light L and the nozzle device 22B ejects the inert gas, the duct 32 is located at the opposite side to the nozzle device 22B with respect to the target 100 (duct 32 as indicated by a dashed-dotted line in FIG. 1). In this case, the duct 32 sucks the inert gas that has been ejected from the nozzle device 22B and has passed through above the target 100 through the opening 32e.

As illustrated in FIGS. 1 and 2, the welding apparatus 1 includes a splash guard 41 and a wall 42. The splash guard 41 is located above the target 100. The wall 42 is located above the nozzle device 22, for example.

As described above, in the embodiment, the nozzle devices 22 eject the inert gas to the irradiation position P of the laser light L through the ejection ports 24k located at the forward side in the scanning direction D1 of the laser light L relative to the irradiation position P of the laser light L on the target 100. This ejection causes the fume 110 generated at the irradiation position P (welded portion) of the laser light L by the irradiation with the laser light L to flow to the backward side of the laser light L in the scanning direction D1 (FIG. 7). This flowing of the fume 110 can prevent the fume 110 from passing through the laser light L, thereby preventing lowering of the intensity of the laser light L due to the fume 110. This prevention can ensure preferable welding quality with oxidation reduced.

In the embodiment, the passages 24j through which the inert gas flows are provided in the rectifying members 24b and the rectifying members 24b rectify the inert gas. This rectification can reduce variation in an ejection amount (flow rate) of the inert gas among the ejection ports 24k.

In the embodiment, the inert gas that has flown into the buffer chambers 24n and flown out from the buffer chambers 24n is ejected through the ejection ports 24k. This configuration can reduce the variation in the ejection amount (flow rate) of the inert gas among the ejection ports 24k in comparison with the configuration in which a plurality of ejection ports are provided directly on thin pipes, for example.

In the embodiment, the buffer chambers 24n accommodate the pipes 25. The openings 25a (first openings) that are opened in the directions different from the sides of the ejection ports 24k and through which the inert gas flows out are provided on the pipes 25. This configuration can reduce the variation in the pressure among the places in the buffer chambers 24n, thereby reducing the variation in the ejection amount (flow rate) of the inert gas among the ejection ports 24k.

In the embodiment, the rectifying members 24b (first portion) face the buffer chambers 24n and the ejection ports 24k are provided on the rectifying members 24b. The side walls 24d are provided at the opposite sides to the rectifying members 24b and face the buffer chambers 24n. The pipes 25 are provided between the rectifying members 24b and the side walls 24d and the openings 25a are opened to the sides of the side walls 24d. This configuration can reduce the variation in the pressure among the places in the buffer chambers 24n, thereby reducing the variation in the ejection amount (flow rate) of the inert gas among the ejection ports 24k.

Furthermore, in the embodiment, the duct 32 is located at the opposite side to the nozzle device 22 (the nozzle device 22A or the nozzle device 22B) with respect to the target 100 and sucks the inert gas ejected from the nozzle device 22. The duct 32 can therefore suck the inert gas at the downstream side of the flow of the inert gas.

First Modification

Figure 8:
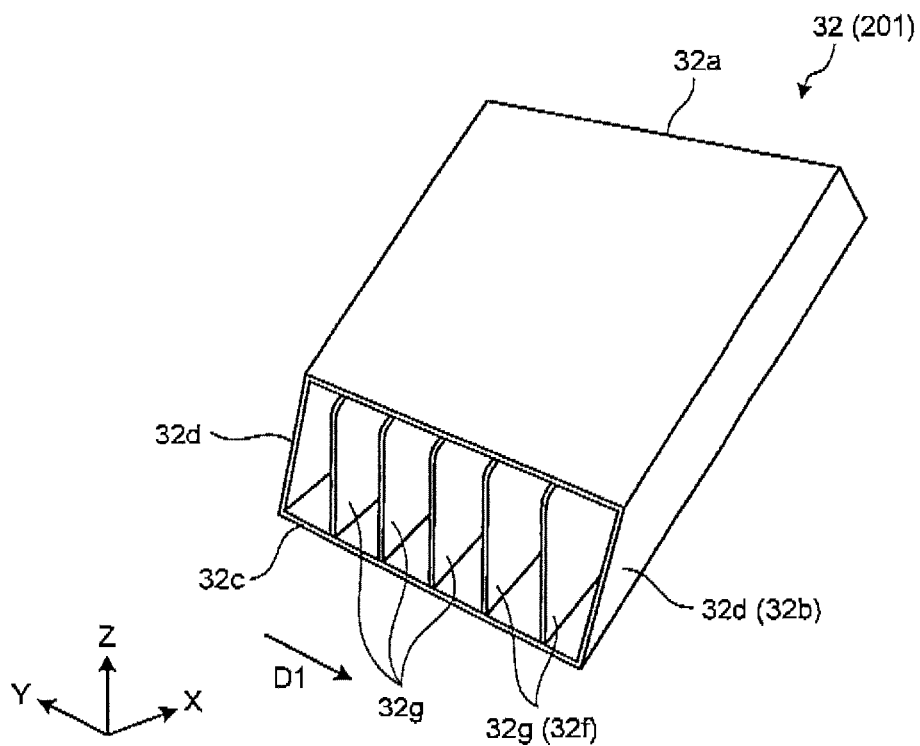
Figure 9:
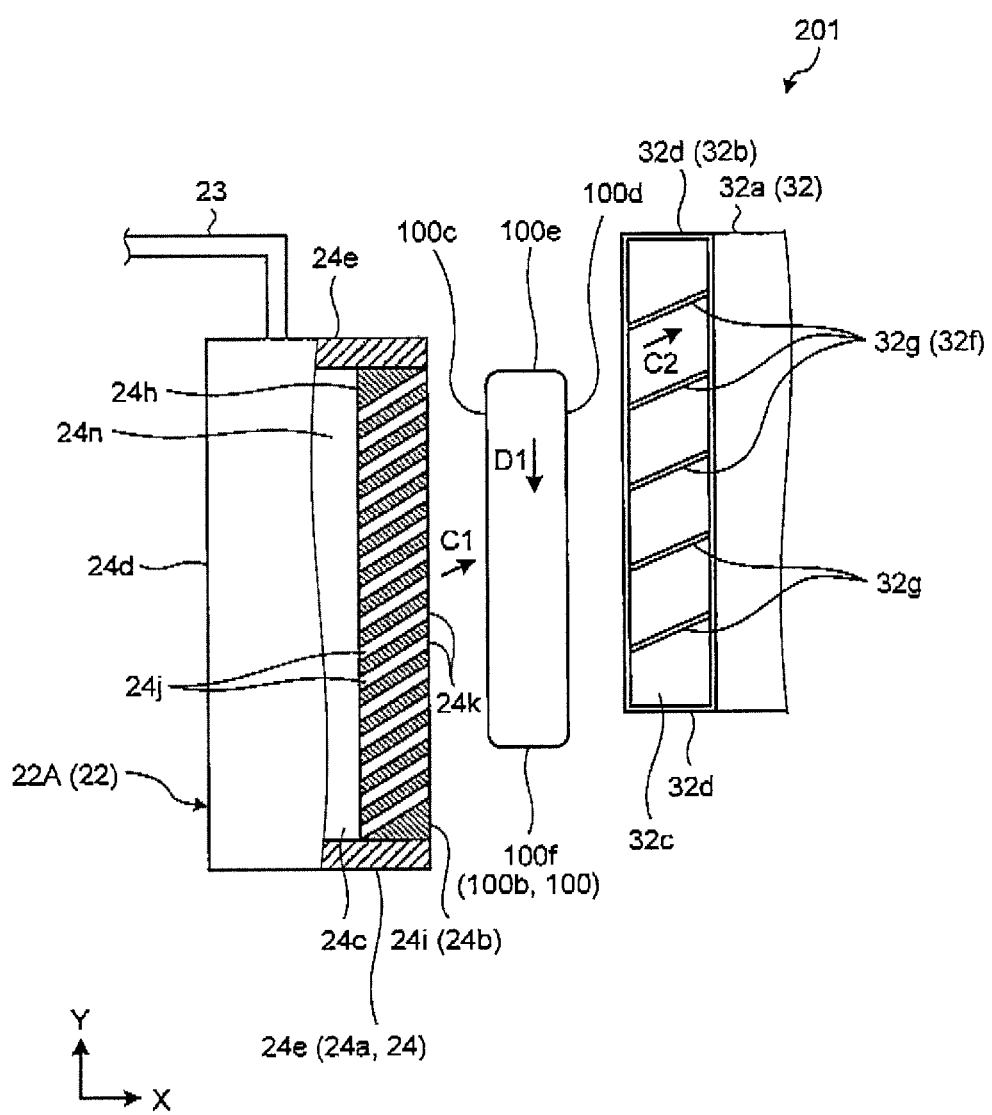
FIG. 9 is an exemplary and schematic perspective view of a duct according to a first modification of the first embodiment.

As illustrated in FIGS. 8 and 9, a welding apparatus 201 in the modification is different from the welding apparatus 1 mainly in a point that a guiding portion 32f is provided in the extension portion 32b of the duct 32.

The guiding portion 32f has a plurality of walls 32g. The walls 32g are provided on the upper surface of the base wall 32c. The walls 32g are aligned at an interval in the direction orthogonal to the cylinder center direction of the cylinder portion 32a. The walls 32g extend to the backward side in the scanning direction D1 of the laser light L toward an upper end portion (end portion at the cylinder portion 32a side) of the base wall 32c from a lower end portion (leading end portion) of the base wall 32c. The guiding portion 32f guides the inert gas to the obliquely backward side of the irradiation position of the laser light L in the scanning direction D1 of the laser light L by the walls 32g. A direction C2 in FIG. 9 indicates the flow direction of the inert gas in the guiding portion 32f.

In the modification, each of the nozzle devices 22 ejects the inert gas to the irradiation position P of the laser light L from the obliquely forward side in the scanning direction D1 of the laser light L and the guiding portion 32f guides the inert gas to the obliquely backward side of the irradiation position P of the laser light L in the scanning direction D1 of the laser light L. This configuration can cause the inert gas to be sucked by the duct 32 while preventing flow of the inert gas from being disturbed.

Second Modification

Figure 10:
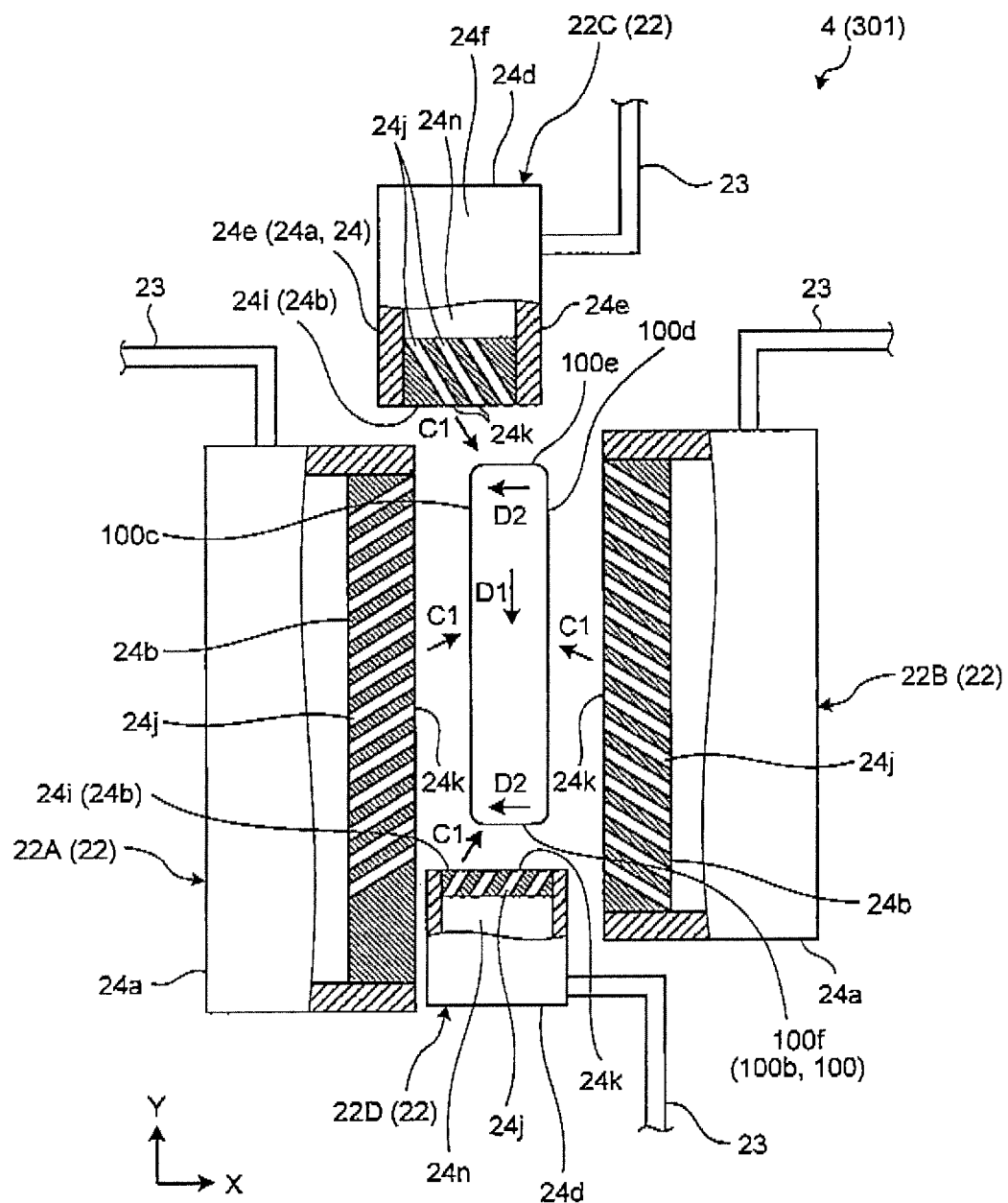
FIG. 10 is an exemplary and schematic plan view (partial sectional view) of a part of a welding apparatus according to a second modification of the first embodiment.

As illustrated in FIG. 10, a welding apparatus 301 in the modification is different from the welding apparatus 1 mainly in a point that nozzle devices 22C and 22D for welding of the short-side portions 100e and 100f of the target 100 are provided in addition to the nozzle devices 22A and 22B. In the modification, each of the long-side portion 100c, the long-side portion 100d, the short-side portion 100e, and the short-side portion 100f is irradiated with the laser light L. In the modification, a scanning direction D2 of the laser light L with which the short-side portions 100e and 100f of the target 100 are irradiated is a direction toward the long-side portion 100c from the long-side portion 100d and is along the X-axis direction.

The configurations of the nozzle devices 22C and 22D are the same as those of the nozzle devices 22A and 22B. It should be noted that the nozzle device 22C faces the short-side portion 100e of the target 100 and the nozzle device 22D faces the short-side portion 100f of the target 100. Each of the nozzle devices 22C and 22D ejects the inert gas to the irradiation position P from the forward side in the scanning direction of the laser light L relative to the irradiation position P of the laser light L on the target 100. To be specific, the inert gas is ejected to the irradiation position P of the laser light L from the obliquely forward side in the scanning direction D2 of the laser light L through the ejection ports 24k located at the forward side in the scanning direction D2 of the laser light L relative to the irradiation position P of the laser light L on the target 100 among the ejection ports 24k of each of the nozzle devices 22C and 22D.

Third Modification

Figure 11:
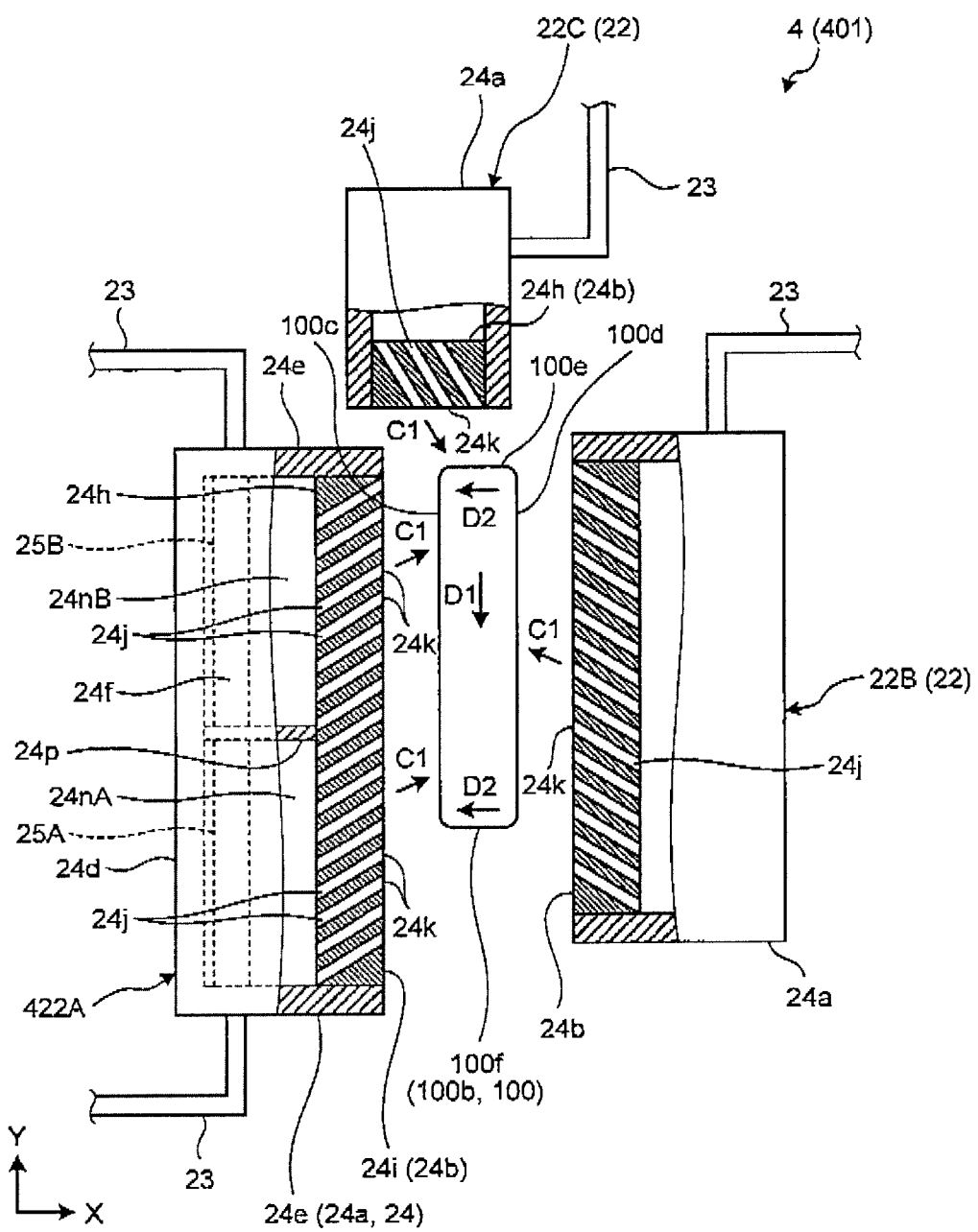
FIG. 11 is an exemplary and schematic plan view (partial sectional view) of a part of a welding apparatus according to a third modification of the first embodiment.

As illustrated in FIG. 11, a welding apparatus 401 in the modification is different from the welding apparatus 301 mainly in points that the configuration of a nozzle device 422A is different from that of the nozzle device 22A and the nozzle device 22D is not provided. In the modification, when the long-side portion 100c and the short-side portion 100f are welded, the nozzle device 422A ejects the inert gas.

The nozzle device 422A includes the nozzle portion 24 and the pipe 25 in the same manner as the nozzle device 22A. The length of the nozzle device 422A in the Y-axis direction is set so as to be capable of ejecting the inert gas to the long-side portion 100c and eject the inert gas to the short-side portion 100f. An inner portion of the body 24a of the nozzle device 422A is partitioned by a partitioning wall 24p and two buffer chambers 24nA and 24nB are provided in the body 24a. The buffer chambers 24nA and 24nB are aligned in the Y-axis direction. One buffer chamber 24nA is provided at a position closer to the short-side portion 100f than the other buffer chamber 24nB. Pipes 25A and 25B are provided for the buffers chambers 24nA and 24nB, respectively. The openings 25a are provided on each of the pipes 25A and 25B in the same manner as the pipe 25.

In the nozzle device 422A having the above-mentioned configuration, when the long-side portion 100c is irradiated with the laser light L, the inert gas is supplied into both of the pipes 25A and 25B. The supply causes the inert gas to be ejected to the irradiation position P of the laser light L from the obliquely forward side in the scanning direction D1 of the laser light L through the ejection ports 24k located at the forward side in the scanning direction D1 of the laser light L relative to the irradiation position P of the laser light L on the target 100 among the ejection ports 24k of the nozzle device 422A. On the other hand, when the short-side portion 100f is irradiated with the laser light L, the inert gas is supplied into one pipe 25A in the nozzle device 422A. The supply causes the inert gas to be ejected to the irradiation position P of the laser light L from the obliquely forward side in the scanning direction D2 of the laser light L through at least some of the ejection ports 24k communicating with the buffer chamber 24nA.

Second Embodiment

Figure 12:
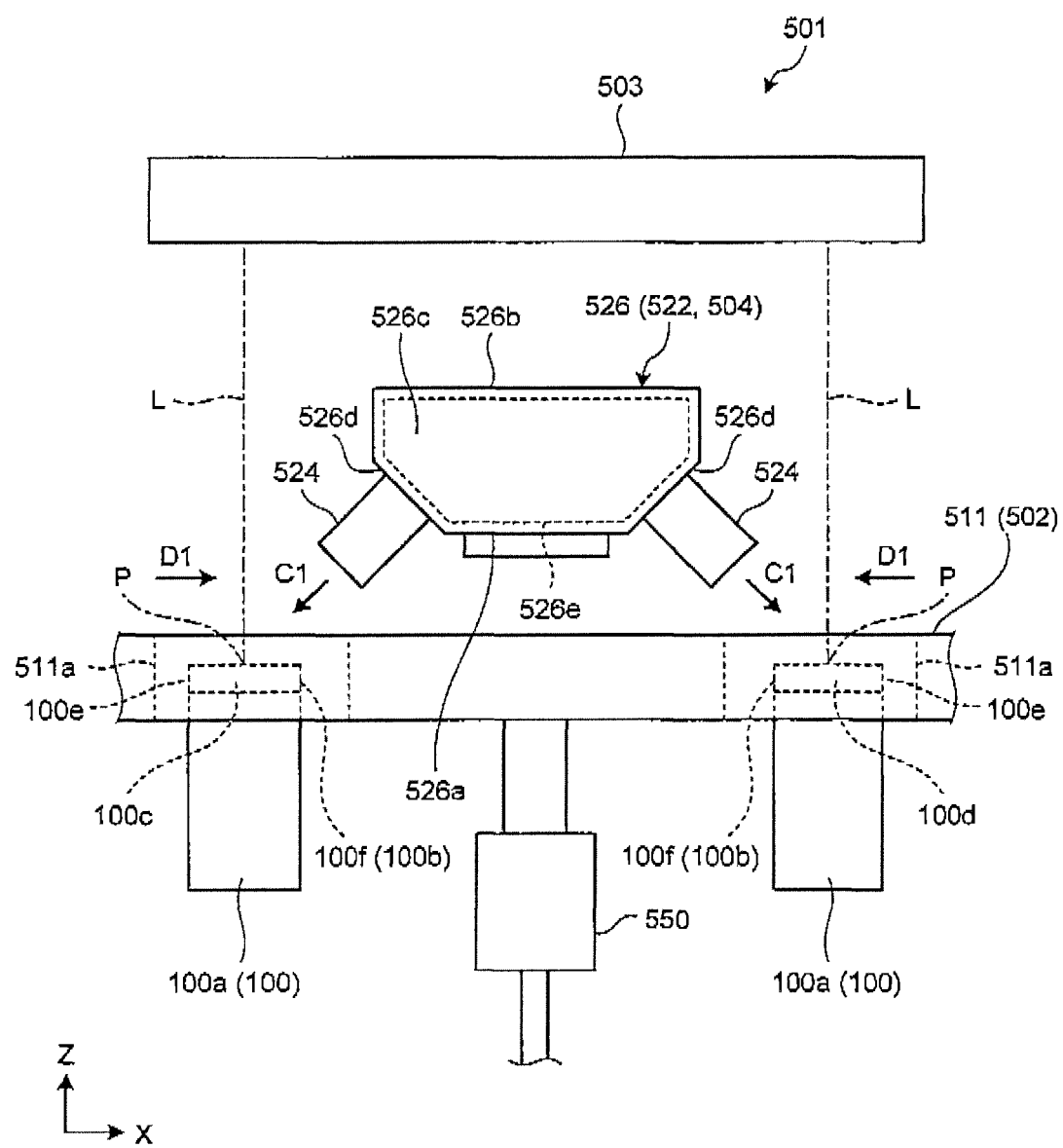
FIG. 12 is an exemplary and schematic view of a welding apparatus according to a second embodiment.

As illustrated in FIG. 12, a welding apparatus 501 in the embodiment irradiates the target 100 with the laser light L and ejects the inert gas onto the irradiation position P of the laser light L on the target 100 in the same manner as the welding apparatus 1 in the first embodiment. With the irradiation and ejection, welding with the laser light L is performed in a state where the irradiation position P of the laser light L is covered with the inert gas. The welding apparatus 501 in the embodiment is different from the welding apparatus 1 in the first embodiment mainly in a point that the welding apparatus 501 welds a plurality of (four as an example) targets 100 at the same time. The welding by the welding apparatus 501 is performed under an atmospheric pressure environment or under a reduced pressure environment as in the case of the welding apparatus 1.

Figure 13:
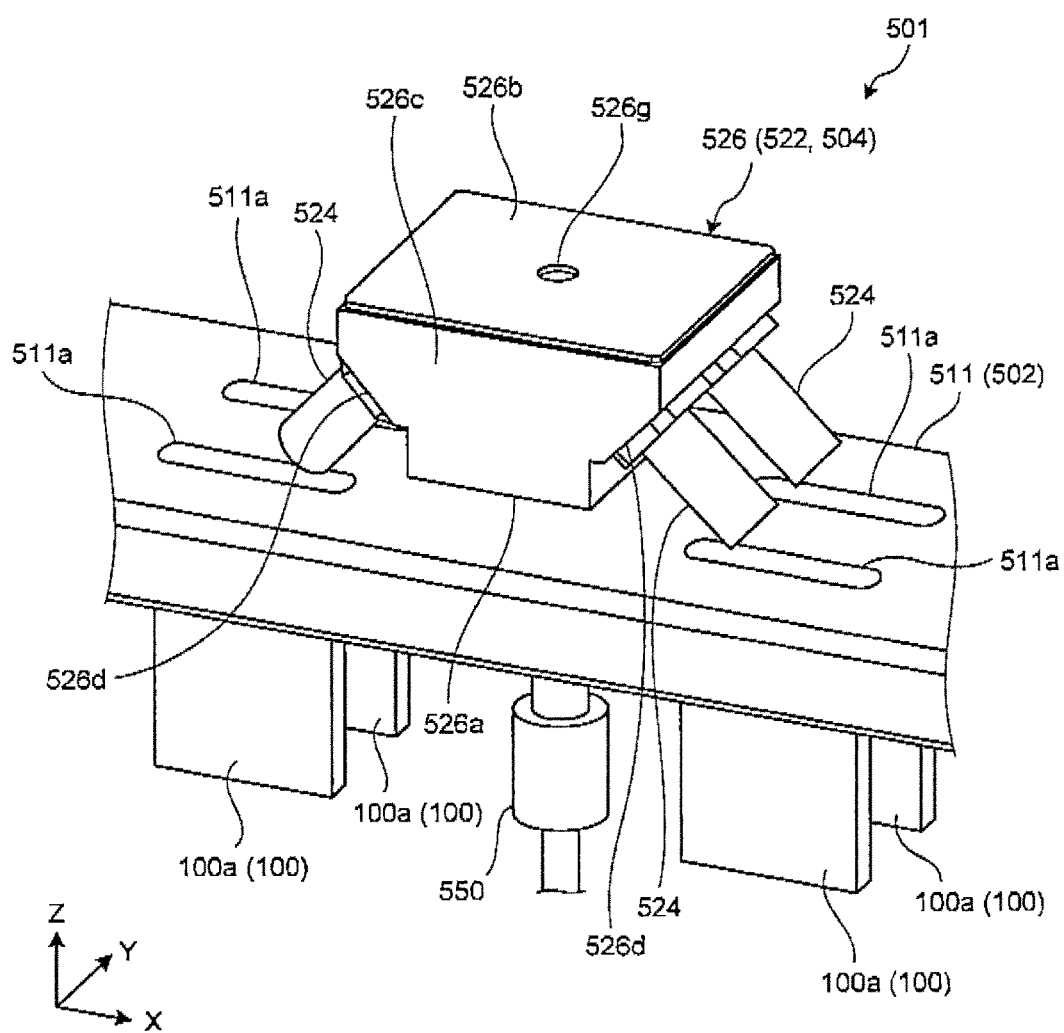
FIG. 13 is an exemplary and schematic perspective view of the welding apparatus in the second embodiment.
Figure 14:
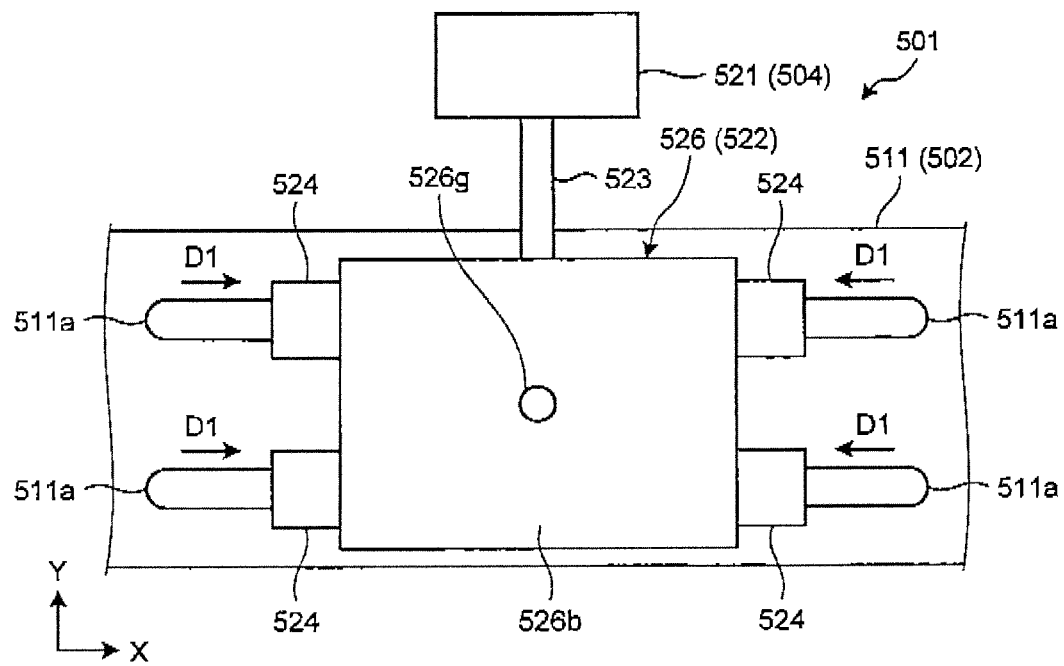
FIG. 14 is an exemplary and schematic plan view of the welding apparatus in the second embodiment.

As illustrated in FIGS. 12 to 14, the welding apparatus 501 includes the support device 502, an irradiation device 503 (FIG. 12), and a gas ejection device 504. The support device 502 supports the targets 100. The irradiation device 503 irradiates the respective targets 100 supported by the support device 502 with the laser light L. The gas ejection device 504 supplies the inert gas to the respective irradiation positions P of the laser light L. It should be noted that the welding apparatus 501 may include a gas suction device sucking the inert gas.

The support device 502 includes a support member 511. The support member 511 has a substantially rectangular parallelepiped outer shape. Four (a plurality of) openings 511a are provided on the support member 511. The openings 511a are through-holes penetrating through the support member 511 in the Z-axis direction. The openings 511a are long holes formed such that the widths in the X-axis direction are larger than the widths in the Y-axis direction. The four openings 511a are arranged in a matrix form of two rows and two columns. At least the members 100b of the targets are located in the respective openings 511a. The targets 100 are coupled to the support member 511 by coupling members (not illustrated). That is to say, the targets 100 are arranged in a matrix form of two rows and two columns. The targets 100 are arranged in postures that the long-side portions 100c and 100d are along the X-axis direction. The two targets 100 adjacent in the X-axis direction are arranged such that the short-side portions 100f oppose each other with the support member 511 interposed therebetween.

As illustrated in FIG. 12, the irradiation device 503 is located above the support device 502. The irradiation device 503 irradiates the targets 100 while scanning the laser light L. The irradiation device 503 may employ either of a system of irradiating the targets 100 with the laser light L at the same time or a system of irradiating the targets 100 with the laser light L sequentially. In other words, the irradiation device 503 emits four (a plurality of) laser light beams L at a time in some cases and emits the laser light L sequentially in other cases. The irradiation device 503 includes various components such as a light source having an oscillation element and emitting the laser light L and a component moving the irradiation position P of the laser light L. The irradiation device 503 can scan (move) the laser light L along the outer surfaces (upper surfaces) of the targets 100. The irradiation device 503 emits the laser light L from the upper sides of the targets 100. The scanning direction D1 of the laser light L with which the long-side portions 100c and 100d of the targets 100 are irradiated is a direction toward the short-side portions 100f from the short-side portions 100e and is along the X-axis direction. The laser light L is continuous laser (CW laser light) or pulse laser.

As illustrated in FIG. 14, the gas ejection device 504 includes one gas supply source 521 (supply unit) and one nozzle device 522.

The gas supply source 521 supplies the inert gas to the nozzle device 522 through a pipe 523. The inert gas may be nitrogen gas, argon gas, or helium gas, or mixed gas containing two or more of the nitrogen gas, the argon gas, and the helium gas, for example. Alternatively, any gas can be used as long as the gas has an effect preventing oxidization of the welded portions.

The nozzle device 522 ejects the inert gas supplied from the gas supply source 521 through the pipe 523 to the irradiation positions P from the forward side in the scanning direction D1 of the laser light L relative to the irradiation positions P of the laser light L for the respective targets 100.

The nozzle device 522 includes one container 526 and four (a plurality of) nozzle portions 524. The container 526 is connected to the pipe 523. The inert gas is supplied into the nozzle portions 524 from the pipe 523 through the container 526. The nozzle portions 524 are provided for the respective targets 100.

As illustrated in FIGS. 12 to 14, the container 526 has a bottom wall 526a, a top wall 526b, and a connecting wall 526c. The bottom wall 526a (wall portion) is located above the support member 511. The bottom wall 526a is formed into a plate-like form having a square shape (for example, rectangular shape). The bottom wall 526a extends along the XY plane. The top wall 526b (wall portion) is formed into a plate-like form having a square shape (for example, rectangular shape). The width of the top wall 526b in the X-axis direction is larger than the width of the bottom wall 526a in the X-axis direction. The top wall 526b faces an upper portion of the bottom wall 526a. The connecting wall 526c connects the bottom wall 526a and the top wall 526b. The connecting wall 526c is configured into a stepped cylinder form. Two inclined walls 526d are provided on the connecting wall 526c. One inclined wall 526d is provided on a portion of the connecting wall 526c that connects one edge portion (end portion) of the bottom wall 526a in the X-axis direction and one edge portion (end portion) of the top wall 526b in the X-axis direction. The other inclined wall 526d is provided on a portion of the connecting wall 526c that connects the other edge portion (end portion) of the bottom wall 526a in the X-axis direction and the other edge portion (end portion) of the top wall 526b in the X-axis direction. The two inclined walls 526d are inclined with respect to the bottom wall 526a. The two inclined walls 526d are closer to each other toward the bottom wall 526a side from the top wall 526b side.

Furthermore, a buffer chamber 526e is provided in the container 526. The buffer chamber 526e is surrounded by the bottom wall 526a, the top wall 526b, and the connecting wall 526c.

The two nozzle portions 524 are coupled to each inclined wall 526d. Openings 526f (FIG. 15) are provided on each inclined wall 526d for the respective nozzle portions 524. The openings 526f are through-holes penetrating through the inclined walls 526d and causes inner portions of the buffer chamber 526e to communicate with the nozzle portions 524. The pipe 523 (FIG. 14) is connected to a portion of the connecting wall 526c that connects one edge portion (end portion) of the bottom wall 526a in the Y-axis direction and one edge portion (end portion) of the top wall 526b in the Y-axis direction. The inert gas that has flown into the buffer chamber 526e through the pipe 523 then flows into the respective nozzle portions 524 through the openings 526f.

Figure 15:
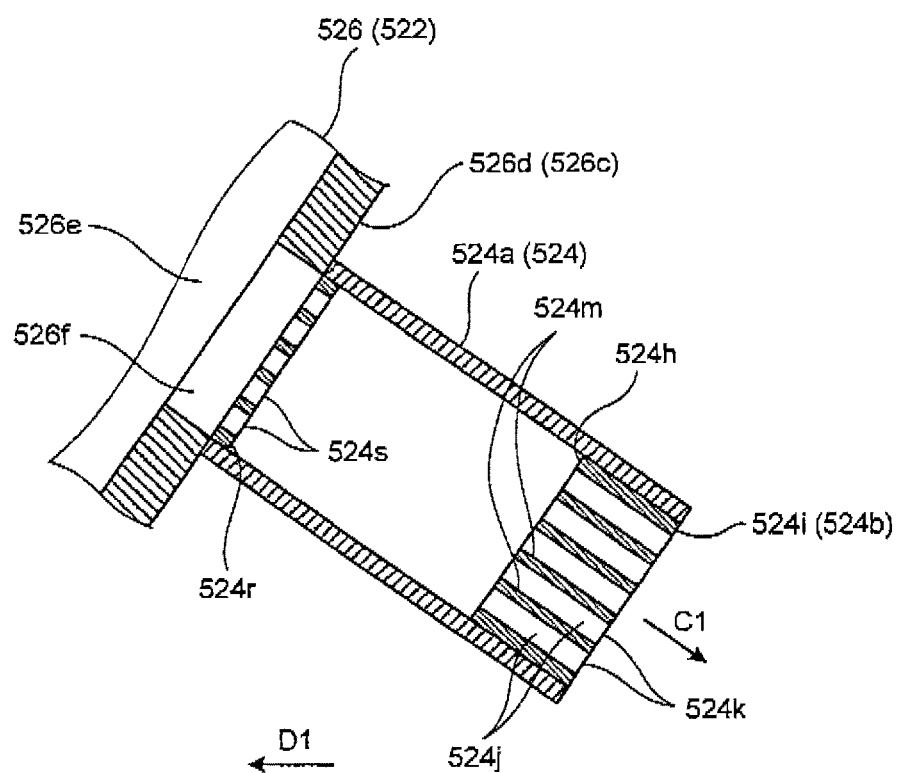
FIG. 15 is an exemplary and schematic sectional view of a part of a nozzle device in the second embodiment.
Figure 16:
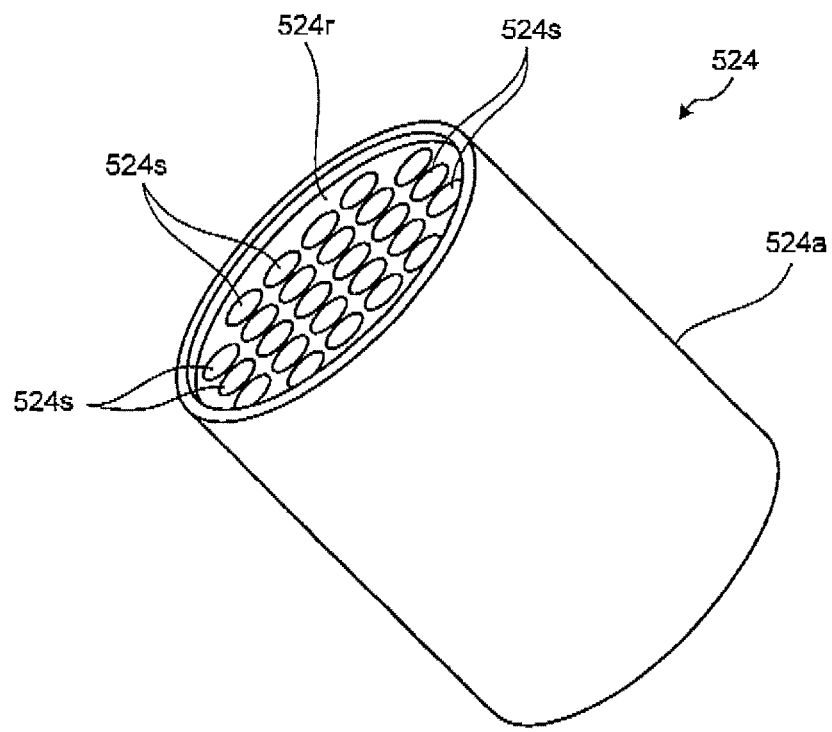
FIG. 16 is an exemplary and schematic perspective view of the nozzle device in the second embodiment.

As illustrated in FIGS. 15 and 16, each nozzle portion 524 includes a body 524a, a resistance member 524r, and a rectifying member 524b. The body 524a is configured into a cylinder form. The body 524a extends from the inclined wall 526d obliquely downward.

Figure 17:
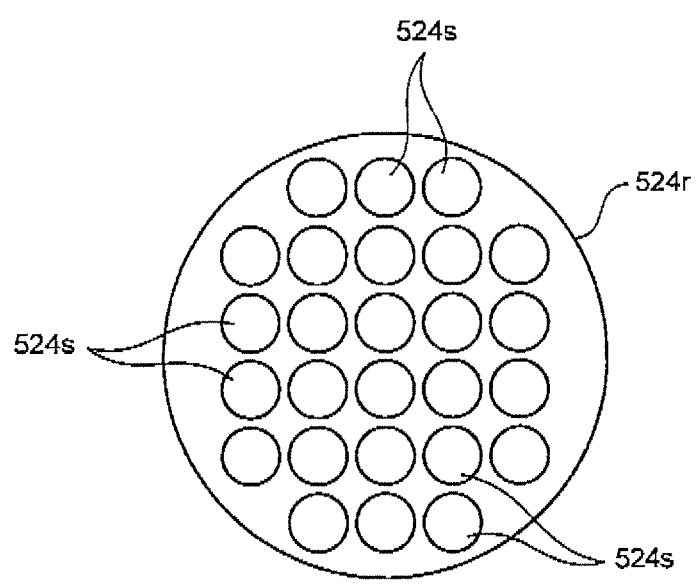
FIG. 17 is an exemplary and schematic view of a resistance member in the second embodiment.

The resistance member 524r is fitted into an upper end portion (end portion at the inclined wall 526d side) of the body 524a and is located in the body 524a. As illustrated in FIGS. 15 to 17, the resistance member 524r is configured into a circular plate-like form. A plurality of openings 524s are provided in the resistance member 524r. The openings 524s are through-holes penetrating through the resistance member 524r in the cylinder center direction of the body 524a. The resistance member 524r is an example of a resistance element and the openings 524s are an example of a second opening.

As illustrated in FIG. 15, the rectifying member 524b is fitted into a lower end portion (end portion at the opposite side to the inclined wall 526d) of the body 524a and is located in the body 524a. The rectifying member 524b is separated from the resistance member 524r. That is to say, a space is provided between the rectifying member 524b and the resistance member 524r.

The rectifying member 524b has faces 524h and 524i. The face 524h faces an inner portion of the body 524a. The face 524i is provided at the opposite side to the face 524h and faces an outer portions of the body 524a.

A plurality of passages 24j are provided in the rectifying member 524b. The inert gas flows in the passages 524j. The passages 524j extend to the face 524i from the face 524h and are opened in the faces 524h and 524i. The passages 524j each are inclined with respect to the scanning direction D1 of the laser light L. To be specific, the passages 524j each extend to the backward side in the scanning direction D1 of the laser light L toward the face 524i from the face 524h. Outlets (openings in the face 524i) of the passages 524j configure ejection ports 524k. The resistance member 524r is located between the ejection ports 524k and the buffer chamber 526e. At least one of the ejection ports 524k is located at the forward side in the scanning direction D1 of the laser light L relative to the irradiation position P of the laser light L.

The rectifying member 524b ejects the inert gas through the ejection ports 524k. In this case, the inert gas is ejected to the irradiation position P of the laser light L from the forward side in the scanning direction D1 of the laser light L through the ejection ports 524k located at the forward side in the scanning direction D1 of the laser light L relative to the irradiation position P of the laser light L on each target 100 among the ejection ports 524k. To be specific, the inert gas is ejected to the irradiation position P of the laser light L from the obliquely forward side and the obliquely upper side in the scanning direction D1 of the laser light L through the ejection ports 524k located at the forward side in the scanning direction D1 of the laser light L relative to the irradiation position P of the laser light L on each target 100 among the ejection ports 524k.

The sections of the passages 524j in the direction intersecting with the extension direction of the respective passages 524j have hexagonal shapes and the rectifying member 524b is configured to have a honeycomb structure. The rectifying member 524b includes a plurality of walls 524m forming the passages 524j (facing the passages 524j). It should be noted that the sections of the passages 524j in the direction intersecting with the extension direction of the respective passages 524j are not limited to the hexagonal shapes and may be polygonal shapes other than the hexagonal shapes, circular shapes, or the like. The rectifying member 524b is also referred to as an ejection unit.

In the nozzle device 522 having the above-mentioned configuration, the inert gas flows into the buffer chamber 526e through the pipe 523. The inert gas that has flown into the buffer chamber 526e is distributed into the four nozzle portions 524. The inert gas that has flown into the nozzle portions 524 from the buffer chamber 526e flows toward the rectifying members 524b through the openings 524s of the resistance members 524r. Then, the inert gas flows into the passages 524j of the rectifying members 524b. The rectifying members 524b rectify the flow of the inert gas flowing in the passages 524j by the walls 524m. The rectified inert gas is ejected through the ejection ports 524k. In this case, the inert gas is ejected to the irradiation positions P of the laser light L from the obliquely forward side in the scanning direction D1 of the laser light L through the ejection ports 524k located at the forward side in the scanning direction D1 of the laser light L relative to the irradiation positions P of the laser light L on the targets 100 among the ejection ports 524k. The inert gas causes the fume 110 generated from the irradiation positions P by the irradiation with the laser light L and elevating from the irradiation positions P to be flown to the backward side of the laser light L in the scanning direction D1 of the laser light L.

As illustrated in FIG. 13, the welding apparatus 501 includes a power meter 550. The power meter 550 measures the intensity of the laser light L. The power meter 550 is arranged below the support member 511. Openings 526g (the opening 526g in the bottom wall 526a is not illustrated) through which the laser light L passes are provided in the top wall 526b and the bottom wall 526a of the container 526. These openings 526g can be closed by transmissive members through which the laser light L transmits. An opening (not illustrated) through which the laser light L passes is provided in the support member 511. The irradiation device 503 can irradiate the power meter 550 with the laser light L through the respective openings 526g in the top wall 526b and the bottom wall 526a and the opening in the support member 511 through which the laser light L passes. The power meter 550 measures the intensity of the irradiated laser light L.

As described above, in the embodiment, the nozzle device 522 ejects the inert gas to the irradiation positions P of the laser light L through the ejection ports 524k located at the forward side in the scanning direction D1 of the laser light L relative to the irradiation positions P of the laser light L. By the irradiation with the laser light L, the fume 110 generated at the irradiation positions P (welded portions) of the laser light L flows to the backward side of the laser light L in the scanning direction D1 of the laser light L. This flowing of the fume 110 can prevent the fume 110 from passing through the laser light L, thereby preventing lowering of the intensity of the laser light L due to the fume 110. This prevention can ensure preferable welding quality with oxidation reduced.

In the embodiment, the passages 524j through which the inert gas flows are provided in the rectifying members 524b and the rectifying members 524b rectify the inert gas. The rectifying members 524b having this configuration can reduce the variation in the ejection amount (flow rate) of the inert gas among the ejection ports 524k.

In the embodiment, the buffer chamber 526e is provided in the container 526. The nozzle portions 524 are provided for the targets 100. The nozzle portions 524 each communicate with the buffer chamber 526e. This configuration can reduce the variation in the ejection amount (flow rate) of the inert gas among the nozzle portions 524 in comparison with the configuration in which a plurality of ejection ports are provided directly on thin pipes, for example.

In the embodiment, the resistance members 524r are provided between the ejection ports 524k and the buffer chamber 526e. The openings 524s (second openings) through which the inert gas passes are provided in the resistance members 524r. This configuration can prevent the flow of the inert gas from being disturbed in the buffer chamber 526e. Furthermore, the configuration can reduce variation in pressure among the places in the buffer chamber 526e, thereby reducing the variation in the ejection amount (flow rate) of the inert gas among the ejection ports 524k.

As described above, the above-mentioned respective embodiments and modifications can prevent lowering of the intensity of the laser light L due to the fume 110.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A welding apparatus comprising:
   an irradiation device that irradiates a target with laser light while scanning the laser light; and
   a nozzle device that includes an ejection port and elects inert gas to an irradiation position of the laser light on the target through the ejection port located a forward side in a scanning direction of the laser light relative to the irradiation position, the nozzle device including a buffer chamber into which the inert gas flows and a plurality of ejection ports through which the inert gas flowing out from the buffer chamber is ejected.

2. The welding apparatus according to claim 1, wherein the nozzle device includes a pipe accommodated in the buffer chamber and including a first opening that is opened in a direction different from a side of the ejection ports and through which the inert gas flows out.

3. The welding apparatus according to claim 2, wherein the nozzle device includes a first portion and a second portion, the first portion including the ejection ports and facing the buffer chamber, the second portion being provided at an opposite side to the first portion and facing the buffer chamber,
   the pipe is located between the first portion and the second portion, and
   the first opening is opened to the second portion side.

4. The welding apparatus according to claim 1, wherein the nozzle device includes:
   a container that includes the buffer chamber; and
   a nozzle portion that includes the ejection ports, communicates with the buffer chamber, and is provided for each of a plurality of the targets.

5. The welding apparatus according to claim 4, further comprising a resistance element that includes a plurality of second openings through which the inert gas passes and is provided between the buffer chamber and the ejection ports.

* * * * *